United States Patent [19]
Ueda

[11] Patent Number: 4,858,148
[45] Date of Patent: Aug. 15, 1989

[54] OUTPUT CONTROL SYSTEM

[75] Inventor: Hiroyuki Ueda, Kawasaki, Japan

[73] Assignee: Canon Kabushiki Kaisha, Tokyo, Japan

[21] Appl. No.: 686,154

[22] Filed: Dec. 26, 1984

[30] Foreign Application Priority Data

Dec. 29, 1983 [JP] Japan ............................ 58-249899

[51] Int. Cl.⁴ ............................ G06F 15/20
[52] U.S. Cl. ............................ 364/518; 400/279
[58] Field of Search ............................ 364/518, 521; 340/716; 400/63, 279, 280

[56] References Cited

U.S. PATENT DOCUMENTS

| | | | |
|---|---|---|---|
| 4,084,680 | 4/1978 | Deetz | 364/900 |
| 4,415,981 | 11/1983 | Cutter et al. | 364/518 |
| 4,460,957 | 7/1984 | Eggebrecht et al. | 364/518 X |
| 4,517,578 | 5/1985 | Tazaki | 364/581 X |
| 4,548,520 | 10/1985 | Ueno | 364/518 X |
| 4,558,965 | 12/1985 | Ueda et al. | 400/705.1 |
| 4,615,631 | 10/1986 | Ueda et al. | 400/144.2 |

*Primary Examiner*—Gary V. Harkcom
*Assistant Examiner*—H. R. Herndon
*Attorney, Agent, or Firm*—Fitzpatrick, Cella, Harper & Scinto

[57] ABSTRACT

An output control system for use in a typewriter, computer or the like. In particular, this system is suitable to output the information of characters, numerals, symbols, etc. and the information which is added thereto, such as the underlined characters, bold characters, or the like. This system also includes a storage unit having a first storage section to store output parameters of the information that should be outputted and a second storage section to store a part of those output parameters; a processing unit which can process the output parameters stored by the storage unit; and an output unit for outputting the information to be outputted on the basis of the output parameters form the storage unit or the processing unit. With this output control system, the number of character selection times can be reduced and the printing operation time can be decreased.

7 Claims, 7 Drawing Sheets

OUTPUT CONTROL SYSTEM

BACKGROUND OF THE INVENTION

1. Field of the Invention

The present invention relates to an output control system for a typewriter, computer, etc. and, more particularly, to an output control system for outputting information relating to characters, numerals, symbols, etc. which should be outputted and information which is added thereto, such as underlined characters, bold characters, etc.

2. Description of the Prior Art

In case of outputting and printing characters, numerals, symbols, etc., there are various kinds of print formats such that desired characters are underlined or printed as bold characters, or the bold characters are further underlined, etc.

For example, as a conventional method of adding the underline, the following method has been known. In this method, when printing is performed in a typewriter, an advance signal is outputted to certainly advance the carrier in response to the printing operation. When adding the underline using this advance signal, a restart signal is given as an underline signal to the printer for printing without operating the stepping apparatus. As the result of control using this method, the printing will be seemingly performed as follows. Namely, a desired character is printed and the underline is printed while the carrier is at rest.

In such a method, priority is given to a signal responsive to the printing operation and various print formats are realized using this signal. Therefore, it will be obviously understood that the range of print format as well as the underline is limited and the above method is inconvenient for a typewriter with highly advanced functions. Namely, the fundamental concept of this method is such that priority is given to the printing of a character and the underline or the like is an additional symbol. Therefore, for instance, it is impossible to realize proportional spacing printing. This is because the proportional spacing printing generally needs the sequence such as the stepping printed characters in order to perform the printing while adjusting the interval between the character which should be printed and the character which has been printed immediately before.

SUMMARY OF THE INVENTION

In consideration of the foregoing points, it is an object of the present invention to provide an output control system comprising storage means having a first storage section to store output parameters of information that should be outputted and a second storage section to store a part of these output parameters; processing means which can process the output parameters stored by the storage means; and output means for outputting the information that should be outputted on the basis of those output parameters from the storage means or processing means.

In consideration of the foregoing points, it is also an object of the invention to provide an output control system comprising storage means for storing output parameters of information that should be outputted; output means for outputting this information on the basis of these output parameters; and operating means for operating the output parameters in order to reduce the outputting operations by the outputting means.

In consideration of the foregoing points, it is a further object of the invention to provide an output control system comprising storage means for storing information that should be outputted and output means for outputting this information, wherein output parameters, such that the sequence of the information which is outputted by the output means may be reversed in a predetermined area, are further stored in the above-mentioned storage means.

In consideration of the foregoing points, it is yet another object of the invention to reduce the number of character selection times in the print of an underlined bold character by performing the bold print after previously outputting the underline or by performing the print in accordance with the reverse sequence.

In consideration of the foregoing points, it is still another object of the invention to provide an output control system in which the output parameters of the information that should be outputted are operated and even in the case where the information has additional information such as underlines or the like, the optimum proportional output can be executed.

DETAILED DESCRIPTION OF THE PREFERRED EMBODIMENT

The invention will now be described in detail hereinbelow with reference to the drawings.

The invention can be applied to any output device including a display or the like if the output medium and output section can be moved relatively.

Figure 1:
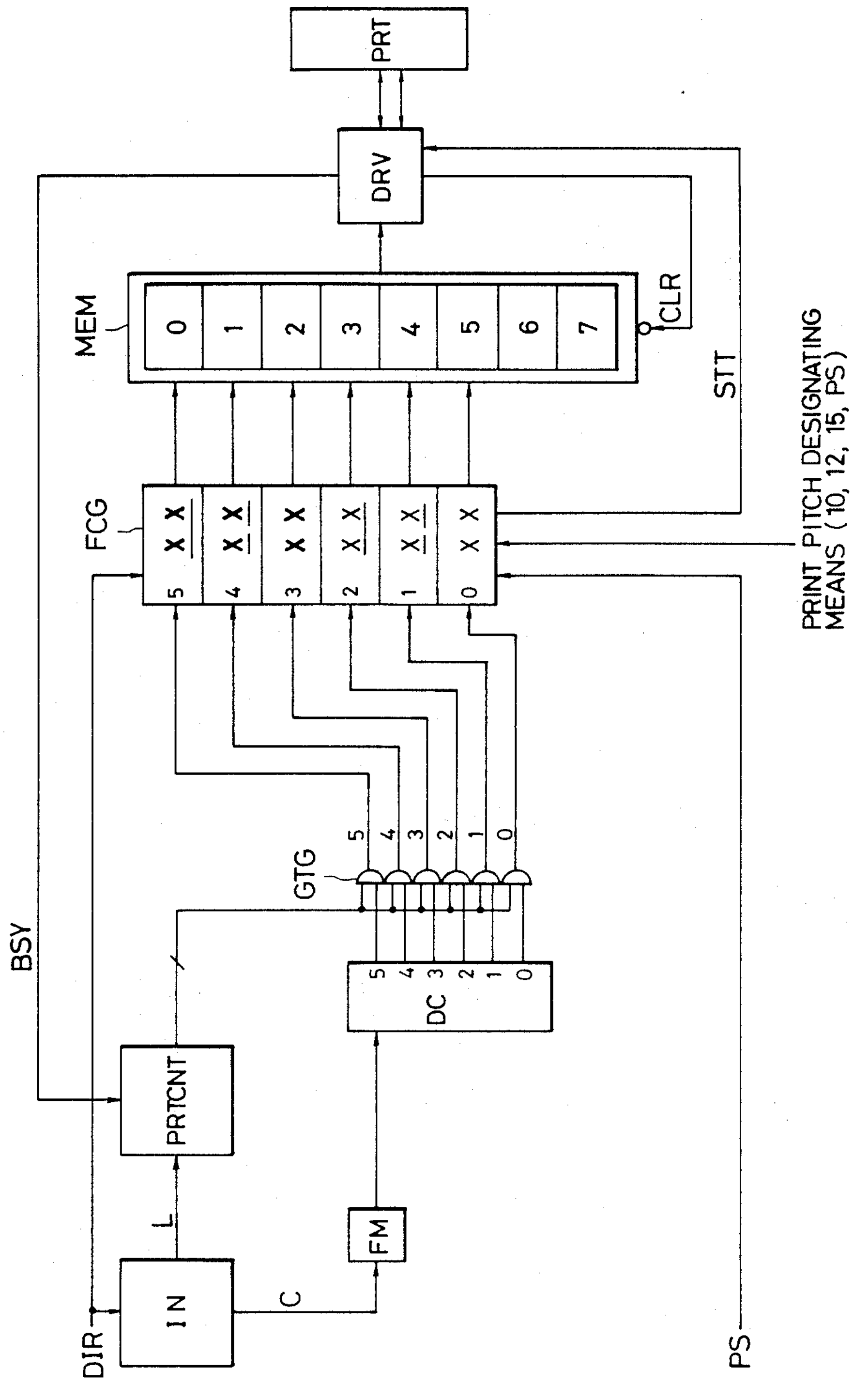
FIG. 1 is a diagram showing one embodiment of the present invention.

FIG. 1 is a block diagram showing one embodiment according to the present invention. IN denotes an input device and it is possible to use any input device which can send information from the apparatus itself such as a keyboard apparatus, storage device, magnetic tape device, or the like. FM is a print format memory. PRTCNT is a print control unit and any control unit which can send desired print character information may be used. A decoder DC receives information of a plurality of bits from the print format memory and makes any one of several outputs active. A gate group GTG is constituted by a plurality of AND gates. FCG is a print format control unit, which will be described in detail later. A memory MEM can store a plurality of print drive parameters. A print driving apparatus DRV can independently execute the print command and stepping command. A printing apparatus PRT can respectively and independently perform the print or stepping operation.

Figure 2:
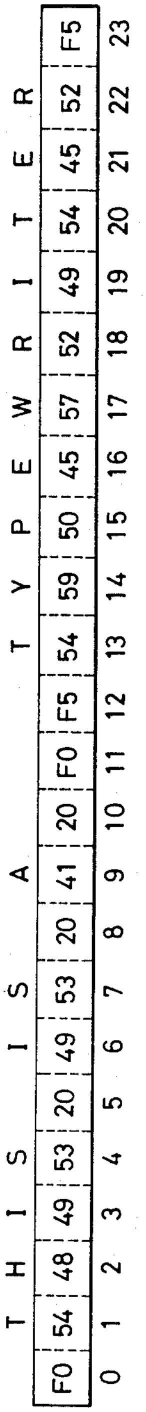
FIG. 2 is a diagram showing the format of the information which is applied to an input device.

Next, the flow of the information in FIG. 1 will be described. First, as shown in FIG. 2, the format of information which is applied to the input device IN is continuous with regard to the character string that should be printed. FIG. 2 is a diagram showing the matrix of the information which is applied to the input device IN when the character string of "THIS IS A TYPEWRITER" is printed. The eight-bit information which was expressed by a hexadecimal number is written in each column. First, column 0 is "FO", and which is a control code relative to the print format control unit FCG. "F" denotes a code to discriminate that the column indicates the control code.

Next column 1 is "54" and is an information exchange code of the character "T". This code relates to the print control unit FCG. As another column that should be explained regarding the structure of the information of FIG. 2, there is column 11 of "FO". This "FO" is not a control code indicative of the end of the normal print format but is a code which is constituted to be usable in case of the reverse printing. That is, when a signal DIR in FIG. 1 is logic "1", the information of FIG. 2 is inputted from column 23 to column 0; therefore, the apparatus according to the invention can be used. On one hand, in this case, a description is made with respect to the positive direction whereby the print is performed from column 0 to column 23 for simplicity of explanation. It will be appreciated, however, that the method of reverse printing can be sufficiently understood by a person skilled in the art. Therefore, the description of the reverse printing operation is omitted. The method of discriminating between the control code and the character code can be realized by a very simple constitution as will be explained later. When a code is detected by the input device IN, a signal line C is made active and when a character code is detected, a signal line L is made active. When "FO" of column 0 is applied to the input device IN, the signal line C is made active, so that "0" of the lower significant four bits in "FO" is latched in the print format memory FM. "FO" is a control code indicative of normal printing. Namely, "F" is a code to discriminate between the control code and the character code and "0" of the lower significant bits is data indicative of "xx". At this time, four bits of the output of the print format memory FM are sent to the decoder DC, so that the normal print, namely, "xx" which is the print format of "THIS IS A" is selected as the output of the decoder DC. Thus, only an output DC-0 of the decoder DC becomes logic "1" and only the GTG-0 in the gate group GTG becomes logic "1", thereby allowing the GTG-0 in the gate group to be enabled. Subsequently, when the character code "54" is applied to the input device IN, the information is sent as it is onto the signal line L and is applied to the print control unit PRTCNT. After the print control unit receives the character code to be printed, it checks the operating state of the print driver DRV through a signal line BSY. When the signal line BSY is logic "0", namely, when the print driver DRV is in the inoperative state, the print control unit outputs the character code. With such timing means, the signal line BSY is needed since the print speed per character is not constant in the apparatus provided with various kinds of print formats such as the normal print format X, bold print format X, etc.

When the signal line BSY is logic "0", the character code is transmitted from the print control unit PRTCNT and is sent to the print format control unit FCG-0 through the gate GTG-0. After the print control unit FCG-0 receives the character code, it allows a plurality of print drive parameters to be stored in the memory MEM as will be explained later. The print drive parameters which are stored at this time include the parameters regarding the positions (or numbers) of the corresponding type elements on fonts for printing desired characters and the parameters relative to the shift amounts (step amounts) in the horizontal direction. When all of the desired parameters are stored, a start signal STT is transmitted to the driver DRV from the print format control unit FCG. In response to the start signal STT, the driver DRV sets the signal line BSY to logic "1", then examines the contents in the memory MEM and takes out only the effective information or the information in the predetermined optimum sequence. The driver DRV then generates commands to the printing apparatus PRT to execute the printing or stepping operation corresponding to each parameter. The printing apparatus PRT performs the corresponding printing or stepping operation whenever it receives each command. Upon completion of the examination of all parameters in the memory, the driver DRV generates a clear signal CLR to make the information ineffective in the whole area of the memory MEM, and at the same time it sets the signal line BSY to logic "0".

In this way, the first character "T" is printed. In a similar manner as described above, the contents of "THIS IS A" are printed. Therefore, detailed description of printing of the remainder of the characters is omitted.

Next, "0" of the lower significant four bits of the code "FO" of column 11 is latched in the FM. However, since the contents in the print format control unit FM are "0" even at the former stage of column 11, nothing changes. That is, the control code of "FO" of column 11 is for reverse printing and indicates that it is inoperative in a forward printing mode. Namely, the same control codes are arranged on both sides of the character codes. Subsequently, when "F5", which is the control code indicative of "X X" of column 12, is applied, "5" is latched in the print format memory FM, so that the GTG-5 is enabled to select the GTG-5. With respect to the data of and after column 13, the print format control unit FCG-5 operates in a similar manner as in the case where the foregoing character codes were applied, so that each underlined bold character is printed. Thus, the series of the character string is completely printed. On the other hand, in this case as well, it is possible to arrange the control code "F5" on both sides of the character codes similarly to the above and to perform reverse printing. As described above, in both cases of reverse printing and forward printing, the data format can be used as it is and there is no need to execute the detection from the former column to search the control code, thereby making it possible to carry out reverse printing at a high speed.

Figure 4:
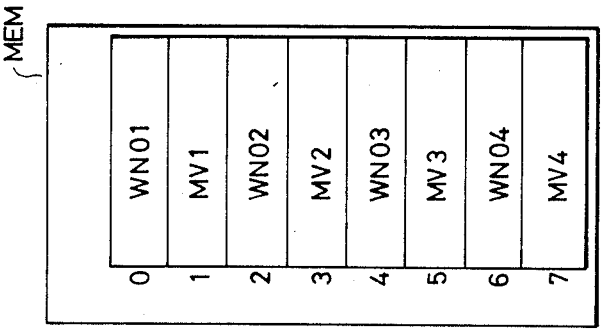
FIG. 4 is a diagram showing the contents in the memory.
Figure 3:
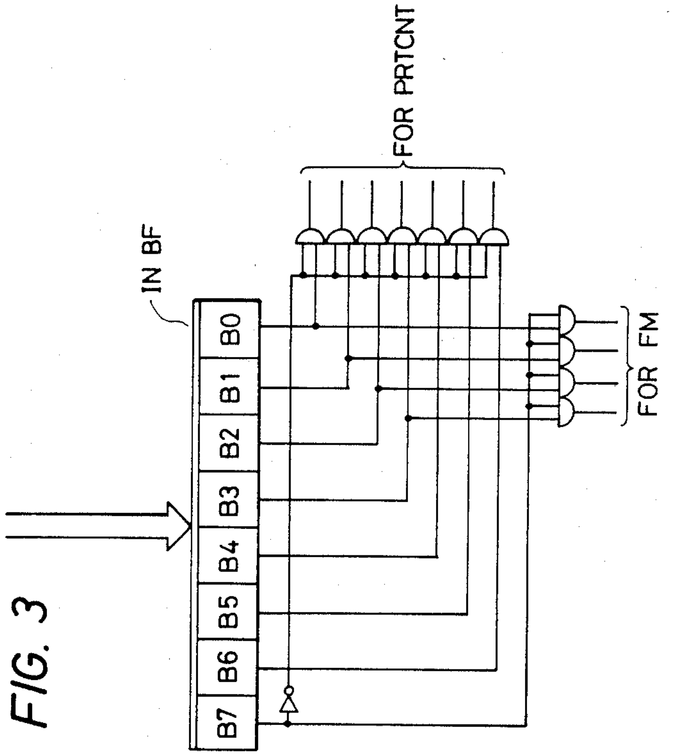
FIG. 3 is a diagram showing means for discriminating control codes from character codes.

The foregoing concept of the present invention will be further explained. FIG. 3 is a detailed diagram of the input device IN, in which INBF denotes an input buffer. This input buffer is constituted by eight bits and a discrimination between the character code and the control code is made due to the logic of the leftmost bit as will be easily understood from the diagram. Consequently, seven-bit information is transmitted to the print control unit PRTCNT, while four-bit information is sent to the print format memory FM. The operation of the print format control unit group MEM will be easily understood from an explanation with reference to flow charts. FIG. 4 shows a diagram of the memory MEM to explain the flow charts. The denominations written in the respective sections of FIG. 4 are the names given to the foregoing print drive parameters. MV1 among these denominations indicates a horizontal shift amount and in this case, it denotes the first shift amount. On one hand, WNO1 is a print type number and indicates the number representing the type which is first printed. That is, these sections are used as the print drive parameters to print one character in various print formats. Four horizontal shift parameters and four type number parameters are prepared in the memory MEM.

The print format control unit group FCG shown in this embodiment is constituted so as to control a total of six kinds of print formats as will be understood from FIG. 1 also. (X X) shown in the FCG in FIG. 1 is the normal print format and is the mode in that no underline is added. (X X is the normal print format and is the mode in which no underline is added to space and only the characters are underlined. (X X) is the normal print format and is the mode in which both characters and spaces are underlined. (X X) is the bold print format and is the mode in which no underline is added. (X X) is the bold print format and is the mode in which no underline is added to the spaces but the characters are underlined. (X X) is the bold print format and is the mode in which both characters and spaces are underlined.

Figure 5:
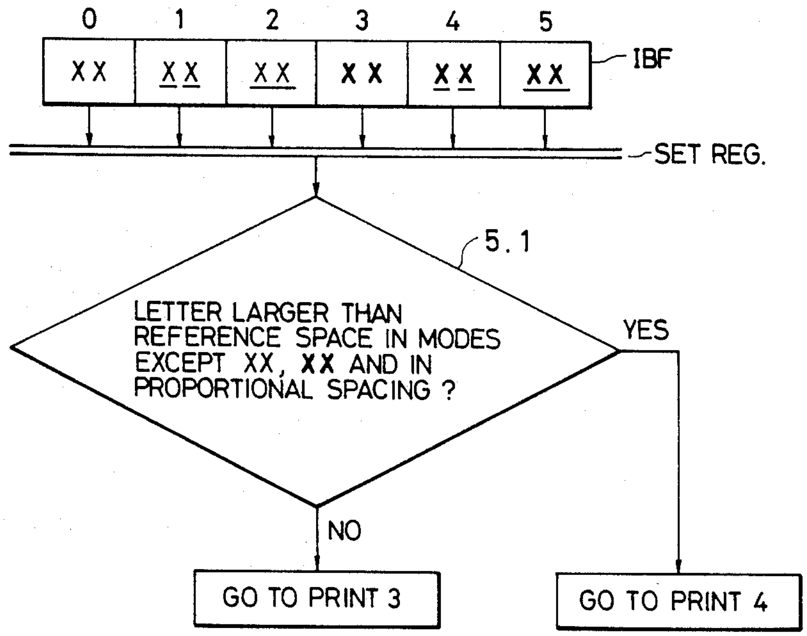
FIG. 5 is a diagram for explaining the input section of a print format control unit group.
Figure 6:
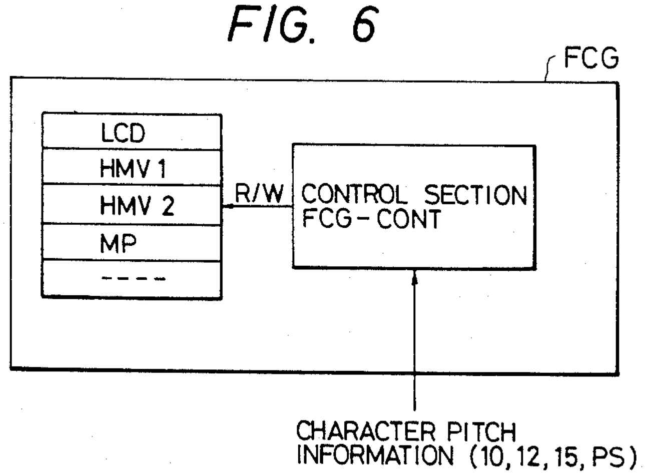
FIG. 6 is a diagram for explaining the contents of the print format control unit group.

Referring now to FIG. 5, when character codes are applied as character information with respect to any one input to the print format control unit FCG, any one of input buffers IBF of the print format control unit group FCG is set. Namely, the IBF-0 is set in case of the normal print format. The set information is held until all operations of the print format control unit group FCG are complete On the other hand, the character codes are stored in registers LCD in the print format control unit group FCG shown in FIG. 6. At this time, the operations of the print format control unit group have already been started. A description will now be made with regard to FIG. 6. FIG. 6 is an explanatory diagram of the inside of the print format control unit FCG, which comprises registers LCD, HMV1, HMV2, and MP, and a control section FCG-CONT. These internal registers are read and written into by the FCG-CONT. The above-mentioned storage of the character codes in the register LCD was performed by the control section FCG-CONT. Next, the control section FCG-CONT refers to the information from character pitch designating means and when any one of the pitches of 10, 12 and 15 is designated, the FCG-CONT clears the register HMV1 (sets the value of the HMV1 to 0). When a proportional spacing PS is designated, the FCG-CONT allows the value to be stored in the register HMV1 by the following method. For instance, if the character corresponding to the content of the register LCD is "I", the operation of (16–24)/2 is performed with regard to the amount of character width which is peculiar to character "I" (i.e., the peculiar character width of 16) and the amount (24) of reference stepping width of the proportional space and the result "-4" of the operation is stored in the HMV1. In a similar manner as above, the operation of (28–24)/2 is executed regarding another character "M", so that the result "2" is stored in the HMV1. In this case, the above-mentioned numeric value "16" corresponds to the amount (=16/240) of character width which is peculiar to character "I". On the other hand, the result "20" of the operation of (16+24)/2 is stored in the HMV2 in case of character "I", while the result "26" of the operation of (28+24)/2 is stored in the HMV2 in case of character "M".

Namely, in this embodiment, the reference stepping amount and the amount of character width which is peculiar to a desired character that should be printed are compared before printing, thereby determining a desired position where the print should be performed (HMV1). After completion of the print, the carriage (i.e., printing apparatus) is moved by only the amount of which half of the character width amount which is peculiar to the printed character and half of the amount of reference stepping width were added (HMV2). On the other hand, in the case where the print pitch designating means designates 10, 12 or 15, there is no need to redetermine the printing position immediately before a desired character is printed. Therefore, the register (HMV1) is cleared and "24", "20", or "16" may be stored in the register (HMV2), respectively. After completion of storage of the numeric values in the registers HMV1 and HMV2 in this way, the register MP is cleared, thereby completing the initialization of the necessary registers. This initialization is made to correspond to the locations shown at SET REG in FIG. 5. Next, the control routine advances to step 5.1 in FIG. 5, in which a check is made to see if the character width is larger than the reference stepping width in the other modes than X X and X X and in the proportional spacing PS. For instance, in case of character "M", the result of (28–24)/2, i.e., the numeric value "2" is derived. The reason why this discriminating step is provided is because, in case of the proportional spacing PS, the control is divided into two cases where the result of the operation of (character width - reference stepping width)/2 is a numeric value "1" or more and where it is less than "1". This is because, in case of adding the underline, it is necessary to prevent discontinuity with the underline added to the character which has been printed immediately before as a result of the fact that the underline is the type element which generally has the same length as the reference stepping width. Practically speaking, it is prevented that the underlines are printed discontinuously such as M M M. As the result of step 5.1 in FIG. 5, the control routine advances to PRINT4 in FIG. 8 or to PRINT3 in FIG. 7.

Figure 7:
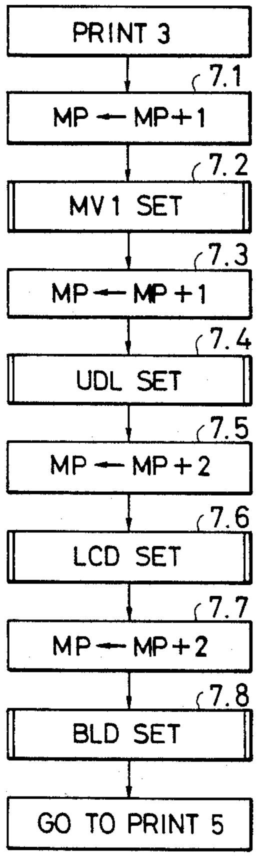
FIGS. 7 to 13 are flow charts showing in detail the operations of the print format control unit group.
Figure 10:
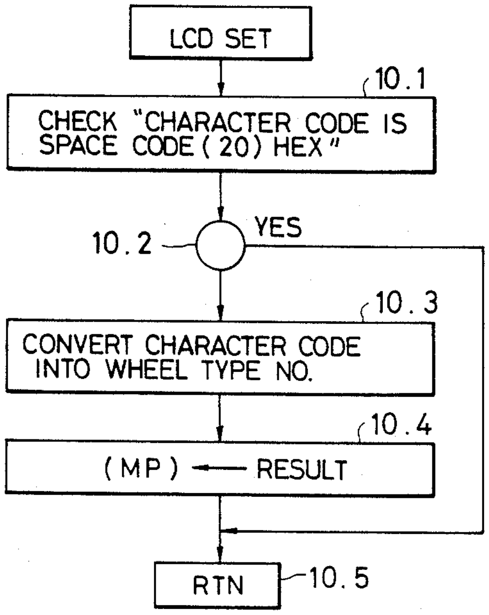
Figure 11:
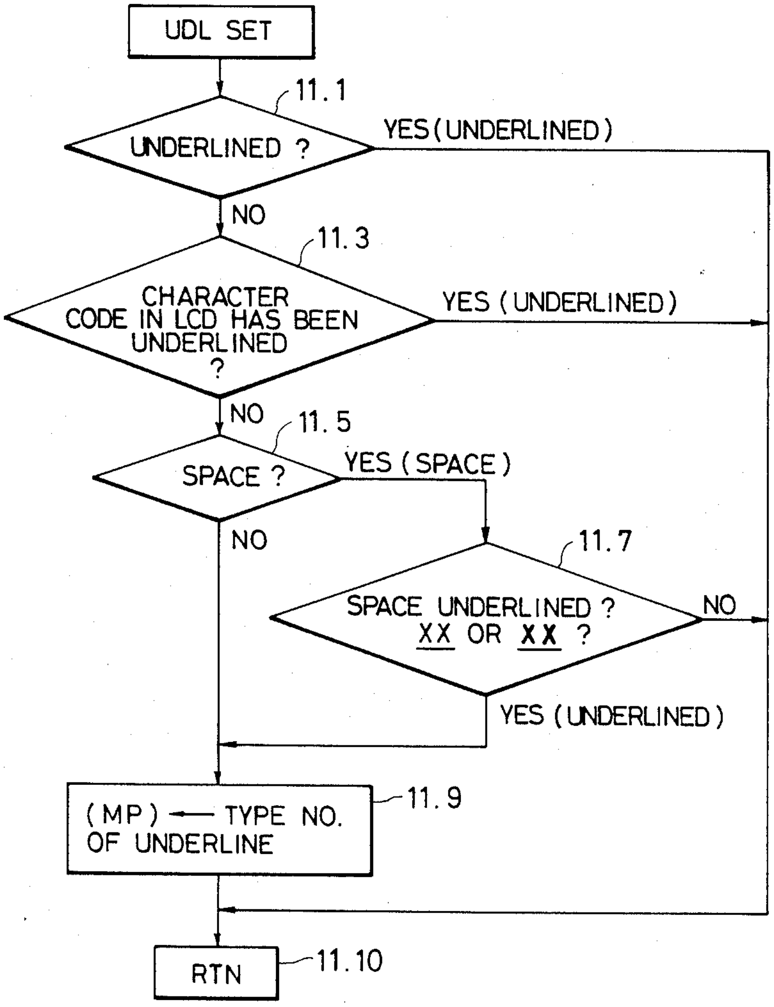

FIG. 7 shows a flow chart in case of performing the printing and stepping operations without executing the correction with respect to the continuous underlines as mentioned above. In step 7.1 "1" is added to the memory pointer register MP memory MEM shown in FIG. 4. Next, in step 7.2, a sequence MV1SET to control the first shift amount is taken in (which will be explained in FIG. 9). In step 7.3, "1" is added to the register MP. In step 7.4, a sequence to control the addition of the underlines is taken in (which will be explained in FIG. 11), thereby designating the address where the type number, which will be explained with respect to FIG. 11, is stored. In step 7.5, "2" is added to the register MP. In step 7.6, a control sequence to print a desired character is taken in (which will be described in FIG. 10). Subsequently, in step 7.7, "2" is added to the register MP and in step 7.8, a control sequence to satisfy the bold print is taken in (which will be explained in FIG. 12). Then, the process routine advances to PRINT5 in step 8.13 in FIG. 8. For PRINT5 in FIG. 8, "1" is added to the register MP in step 8.14 and a sequence to control the stepping operation after printing is taken in (in step 8.15), then the signal line STT shown in FIG. 1 is finally made active (in step 8.16), thereby allowing the driver DRV to be actuated. In this way, the control routine is finished.

Figure 8:
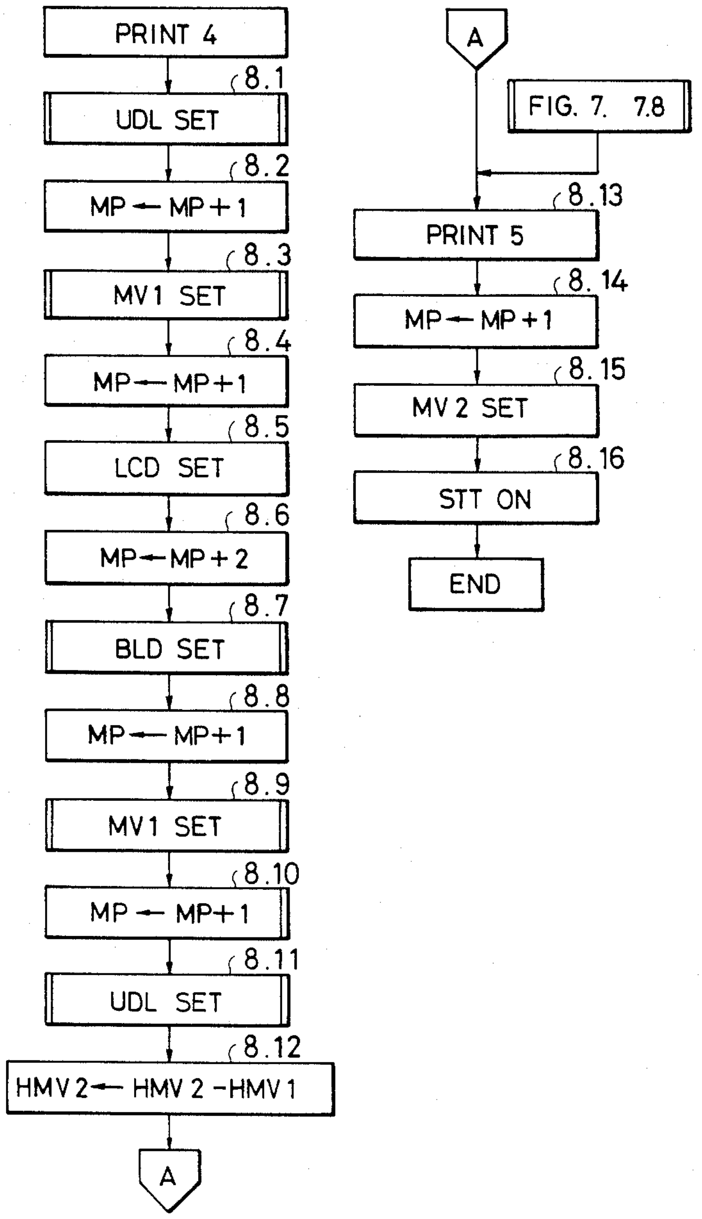

On the other hand, a flow chart for PRINT4 in FIG. 8 shows the control method regarding the underlined characters in the case where the proportional spacing PS is designated and desired characters are printed at the positions that are slightly shifted to the right from the stationary position. First, in step 8.1, a control sequence to add the underlines is taken in (which will be explained in FIG. 11). In step 8.2, "1" is added to the register MP. In step 8.3, the shift amount is set (which will be described in FIG. 9). In step 8.4, "1" is added to the register MP. In step 8.5, the type number of desired print characters is set (which will be explained in FIG. 10). In step 8.6, "2" is added to the register MP. In step 8.7, a control sequence for the bold print is taken in (which will be explained in FIG. 8). In step 8.8, "1" is added to the register MP. In step 8.9, necessary means is executed to slightly shift the print position to the right for the subsequent underline print. In step 8.10, "1" is added to the register MP. In step 8.11, the number of type of the underline is set. In step 8.12, the stepping amount after the print is adjusted. Then, the process routine advances to PRINT5 in step 8.13. The subsequent processes are similar to the case of PRINT3. As will be understood from the above-described flow chart, according to the method of PRINT4 shown in FIG. 8, the print drive parameters in the sequence of the underline, space, are arranged desired character, space, and underline. This enables the continuous underlines to be easily realized in the proportional spacing mode. Also, making of a structure of the control sequence makes it possible to realize a compact control sequence.

Figure 9:
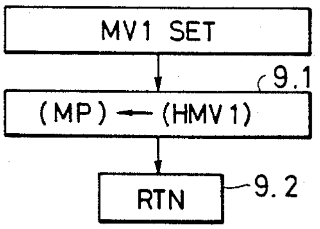

FIG. 9 shows the sequence taken in the method of the foregoing PRINT3 or PRINT4. In step 9.1, the content of the register HMV1 is written in the address indicated by the register MP and in step 9.2, it is returned to the sequence (PRINT3 or PRINT4) in which the control sequence was taken. FIG. 10 also shows the control sequence taken in the PRINT3 or PRINT4. In step 10.1, the register LCD is checked. In the case where the character code is the space in step 10.2, the process routine advances to YES and nothing is performed, then the control sequence is returned to the original step in step 0.5. When the character code is not the space, the character code is converted to the type number in the type wheel in step 10.3. In step 10.4, the result of conversion is written in the address indicated by the register MP. Thereafter, in step 10.5, the control sequence is returned to the original step.

FIG. 11 also shows the control sequence taken in PRINT3 or PRINT4. In step 11.1, a check is made to if the print format is in the underlined where the character code has already designated the underline, there is no need to further add the underline, so that the control sequence advances to step 11.10. In step 11.5, a check is made to see if the character code is a space (the space code is (20)HEX as shown in FIG. 2) or not. If the character code is not a space, step 11.9 will follow. When it is a space code, a check is made in step 11.7 to see if the space is underlined or not. If YES, step 11.9 will follow. In other cases, step 11.10 follows. In step 11.9, the type number of the underline is stored in the address indicated by the register MP. In step 11.10, the control sequence is returned to the original sequence similarly to the foregoing example.

Figure 12:
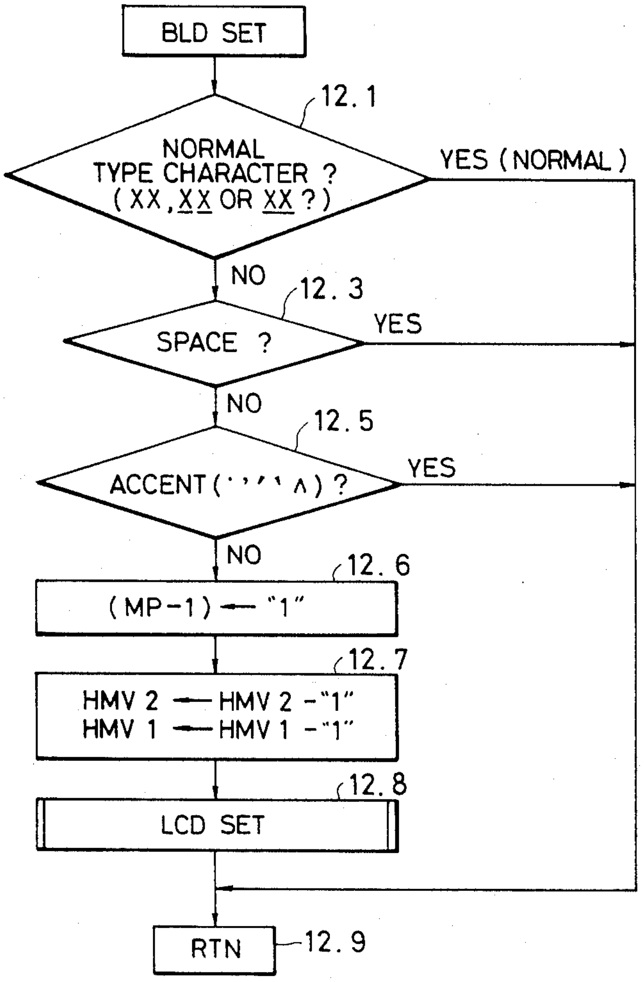

FIG. 12 also shows the control sequence taken in PRINT3 or PRINT4. In step 12.1, a check is made to see if the print format is the normal print mode or the bold print mode. If it is the normal print mode in step 12.1, the control sequence will advance to step 12.9. In step 12.3, the character code is checked to see if it is a space or not. When it is a space code, step 12.9 follows. Further, in step 12.5, a check is made to see if a desired character which should be printed as a bold type is an accent symbol or not. If it is the accent symbol, the control sequence will advance to step 12.9 from step 12.4. If NO, the control sequence will advance to step 12.6 to execute the control for the bold print. First, the minimum shift unit "1" is set into the address which is smaller by only "1" than the address indicated in the register MP in order to allow the print to be performed at the location that is shifted to the right by 1/240 inch from the normal print character. In step 12.7, the operation for correcting the pitch regarding the operation in step 12.6 is carried out. In step 12.8, the control sequence shown in FIG. 10 is taken in and the control sequence is returned to the original control sequence in step 12.9.

Figure 13:
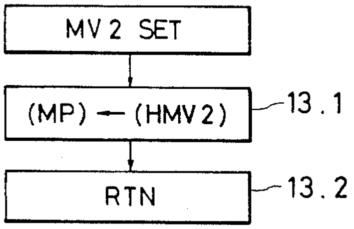

FIG. 13 shows a part of the sequence shown in FIG. 8 similarly to FIG. 9. The content in the HMV2 is stored in the address shown by the register MP, then in step 13.2, the control sequence is returned.

As described above, in case of printing the underlined bold character, the print is performed in accordance with the sequence of the underline, desired character and desired character. Therefore, the number of character selection times is reduced to two as compared with three which has been required in case of the conventional sequence of the desired character, underline and desired character, thereby enabling the printing speed to be improved.

In addition, a control is made such that the accent symbol is not printed as the bold print, thereby making it possible to eliminate the unnecessary printing operation time.

What is claimed is:

1. A printer for printing character information with an underline, said printer comprising:
   - store means for storing character code information to be printed and from which the character code information can be read out;
   - determination means for determining whether the character code information read out from said store means is to be printed with an underline; and
   - print control means, responsive to the determination by said determination means that the character code information read out from said store means is to be printed with the underline, for printing the underline for the character code information to be printed with the underline, and subsequently for printing character information associated with the character code information to be printed with the underline in accordance with a reference stepping amount of said printer.

2. A printer according to claim 1, further comprising a type unit having fonts respectively corresponding to the underline and the character code information to be printed.

3. A printer according to claim 2, wherein said print control means includes means for selecting the underline font of said type unit and subsequently selecting said character code information font to be printed.

4. A printer for printing character information with an underline, said printer comprising:

store means for storing character code information to be printed and from which the character code information can be read out;

determination means for determining whether the character code information read out from said store means is to be printed with an underline;

shift means for shifting the position at which character code information is printed at each printing of the print information read out from said store means in accordance with a reference stepping amount of said printer; and print control means, responsive to the determination by said determination means that the character code information read out from said store means is to be printed with an underline, for printing the underline and subsequently printing character information associated with the character code information to be printed and for causing said shift means to shift to the next print position in accordance with the reference stepping amount of said printer.

5. A printer according to claim 4, further comprising a type unit having fonts respectively corresponding to the underline and the character code information to be printed.

6. A printer according to claim 5, wherein the width of the underline font is equal to the distance of shift of printing position performed by said shift means.

7. A printer according to claim 4, wherein said print control means includes means for selecting the underline font of said type unit and subsequently selecting said character code information font to be printed.

* * * * *

UNITED STATES PATENT AND TRADEMARK OFFICE
CERTIFICATE OF CORRECTION

PATENT NO. : 4,858,148

DATED : August 15, 1989

INVENTOR(S) : Hiroyuki Ueda

It is certified that error appears in the above-identified patent and that said Letters Patent is hereby corrected as shown below:

COLUMN 1

Line 5, close up right margin.
Line 6, close up left margin.
Line 34, change "format" to --formats--.

COLUMN 3

Line 4, change "TYPE-" to -- TYPE- --.
Line 5, change "WRITER"" to --WRITER"--.
Line 7, delete "and".
Line 18, delete "the".
Line 31, change "a code" to --a control code--.
Line 32, close up right margin.
Line 33, close up left margin.
Line 62, change "bold print format X" to --bold print format X,--

COLUMN 4

Line 4, change "on" to --or--.
Line 40, change "enabled to select the GTG-5." to --enabled--.
Line 49, Close up right margin.
Line 50, Close up left margin.

UNITED STATES PATENT AND TRADEMARK OFFICE
CERTIFICATE OF CORRECTION

PATENT NO. : 4,858,148

DATED : August 15, 1989

INVENTOR(S) : Hiroyuki Ueda

It is certified that error appears in the above-identified patent and that said Letters Patent is hereby corrected as shown below:

COLUMN 5

Line 15, change "that" to --which--.
Line 16, change "(X X" to --(X X)--.
Line 18, change "(X X)" TO --(XX)--.
Line 20, change "(XX)" to --(XX)--.
Line 21, change "(X X)" TO --(X X)--.
Line 24, change "(X X)" to --(X X)--.
Line 34, change "complete" to --complete.--.

COLUMN 6

Line 27, change "XX and XX" to --XX and XX--.
Line 49, change "MP memory" to --MP (refer to FIG. 6) to access the address 1 in the memory--.

COLUMN 7

Line 28, change "parameters" to --parameters are arranged--.
Line 29, delete "are arranged".
Line 46, change "step 0.5" to --step 10.5--.
Line 54, change "to if" to --to see if--.

UNITED STATES PATENT AND TRADEMARK OFFICE

CERTIFICATE OF CORRECTION

PATENT NO. : 4,858,148

DATED : August 15, 1989

INVENTOR(S) : Hiroyuki Ueda

It is certified that error appears in the above-identified patent and that said Letters Patent is hereby corrected as shown below:

COLUMN 7

Line 55, change "underlined where" to --underlined mode or not. If YES in step 11.1, the process routine advances to step 11.10. If NO, the content of the register LCD is checked in step 11.3. In the case where--.

Signed and Sealed this

Twenty-sixth Day of November, 1991

*Attest:*

HARRY F. MANBECK, JR.

*Attesting Officer*

*Commissioner of Patents and Trademarks*